(12) United States Patent
Dingeldein

(10) Patent No.: US 8,604,388 B2
(45) Date of Patent: Dec. 10, 2013

(54) CONTACT TIP ASSEMBLY FOR A WELDING TORCH

(75) Inventor: Matt Dingeldein, Bourbannis, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2419 days.

(21) Appl. No.: 11/374,455

(22) Filed: Mar. 13, 2006

(65) Prior Publication Data

US 2007/0210049 A1    Sep. 13, 2007

(51) Int. Cl.
*B23K 9/10*   (2006.01)

(52) U.S. Cl.
USPC ............. 219/137.42; 219/137.31; 219/137.62

(58) Field of Classification Search
USPC ............................ 219/137.31, 137.42, 137.61
See application file for complete search history.

(56) References Cited

U.S. PATENT DOCUMENTS

| | | | |
|---|---|---|---|
| 3,878,354 A * | 4/1975 | Frantzreb, Sr. ................ | 219/74 |
| 6,852,950 B2 | 2/2005 | Giese | |
| 7,105,775 B2 * | 9/2006 | Giese ........................ | 219/137.42 |
| 2002/0113047 A1 | 8/2002 | Doherty | |
| 2004/0026394 A1 | 2/2004 | Giese | |
| 2004/0079741 A1 | 4/2004 | Keegan | |
| 2004/0079784 A1 | 4/2004 | Giese | |
| 2006/0226132 A1 | 10/2006 | Giese et al. | |
| 2006/0226133 A1 | 10/2006 | Giese | |
| 2006/0226134 A1 | 10/2006 | Giese et al. | |

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A securement member for securing a contact tip to a welding torch assembly is provided. A channel extends axially therethrough and has an internal shoulder that extends into this channel. This internal shoulder abuts against a shoulder on the contact tip, capturing the contact tip between the shoulder and a seating surface on the diffuser and securing the contact tip in the torch assembly. The contact tip is securely seated without threading engagement, facilitating quick release and installation. The exemplary securement member couples to the diffuser such that the egress of fluid from the diffuser is blocked when used for gasless welding. This blocking allows a user to leave the diffuser secured to the welding torch when a gasless electrode is in use.

22 Claims, 3 Drawing Sheets

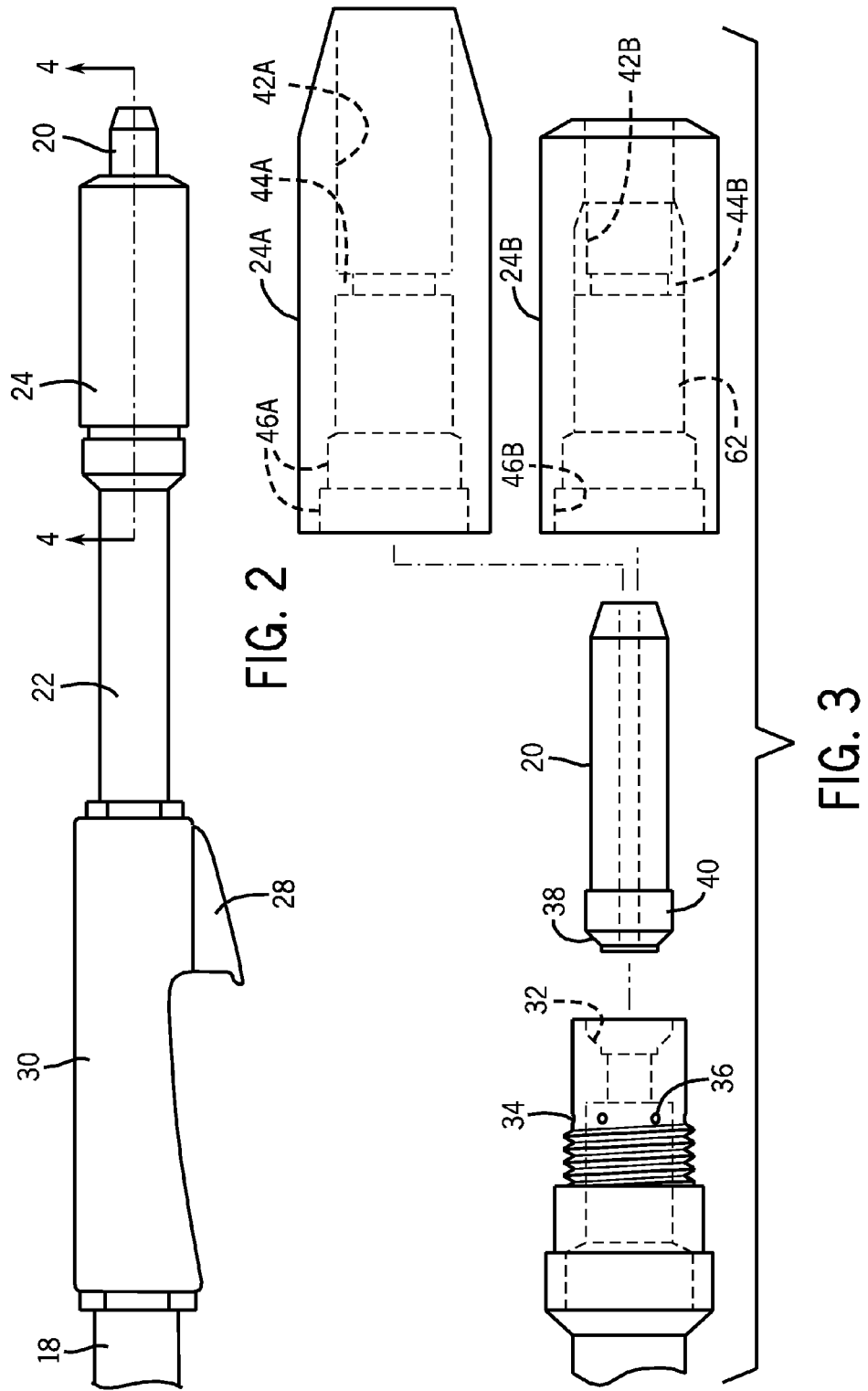

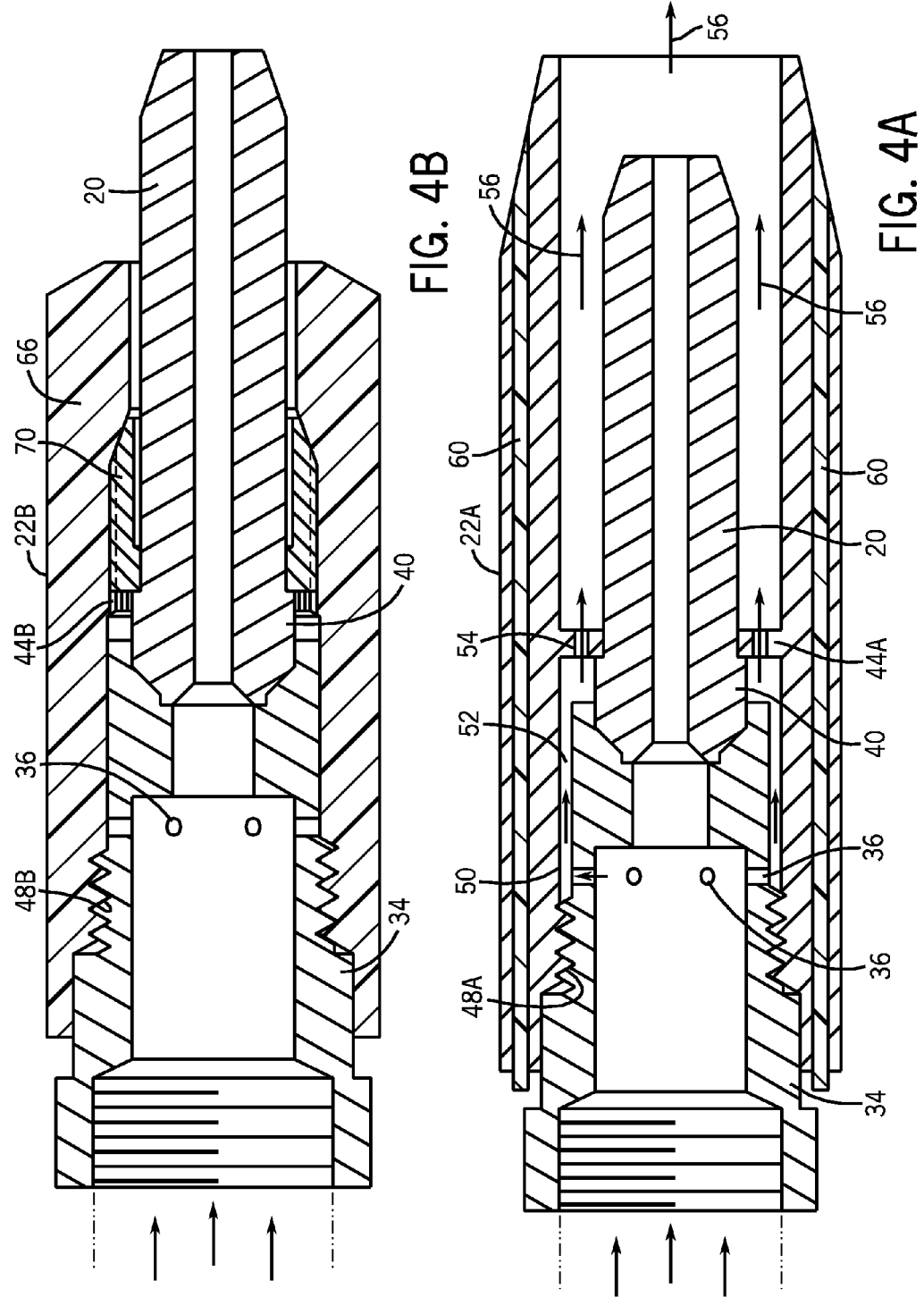

CONTACT TIP ASSEMBLY FOR A WELDING TORCH

BACKGROUND

The present invention relates generally to a tip assembly for a welding torch and, particularly, to a tip assembly for a wire feed welding system.

A common metal welding technique employs the heat generated by electrical arcing to transition a workpiece to a molten state, followed by addition of metal from a wire or electrode. One technique that employs this arcing principle is wire-feed welding. At its essence, wire-feed welding involves routing welding current from a power source into an electrode that is brought into close proximity with the workpiece. When the electrode is sufficiently close to the work piece, current arcs from the electrode to the workpiece, completing a circuit and generating sufficient heat to melt and weld the workpiece. Often, the electrode is consumed and becomes part of the weld itself. Thus, new wire electrode is advanced, continuously replacing the consumed electrode and maintaining the welding arc. If the welding device is properly adjusted, the wire-feed advancement and arcing cycle progresses smoothly, providing a good weld. One common type of wire-feed welding is metal inert gas or "MIG" welding.

In typical wire-feed systems, wire electrode is directed through a welding cable, into a torch assembly, and, lastly, into a contact tip housed within the nozzle assembly. Electrical current is routed from the cable to the wire electrode through the contact tip. When a trigger on the welding torch is operated, wire electrode is advanced toward the contact tip, at which point current is conducted from the contact tip into the egressing electrode.

Because of its proximity to the weld location, a contact tip is exposed to weld splatter and relatively high-levels of heat. Accordingly, contact tips require more frequent maintenance or replacement than other components of the welding system. To facilitate quick replacement of contact tips, present assemblies include certain "threadless" contact tip assemblies, in which the contact tip is not threaded with respect to the remainder of the torch assembly.

Unfortunately, there are a number of problems associated with existing threadless contact tip designs. As one example, the structures for binding the contact tip in the welding torch can impart bending stresses on the contact tip. As another concern, variations in the distance between the contact tip and the exterior portion of the nozzle, known as the tip-nozzle recess, occur with existing threadless contact tip designs. A consistent tip-recess distance is highly desireable in certain welding applications, especially robotic welding systems. In addition, molten spatter from the weld may deposit on the end of the nozzle, eventually requiring replacement of the nozzle. Consequently, nozzles having a nozzle body and a removable threaded end section have been developed. However, weld spatter may contaminate the threads or the threads may experience galling, requiring a tool, such as a wrench, to remove the threaded end section from the nozzle body.

Furthermore, to prevent the ingress of impurities into the molten weld, a flow a shielding material is typically provided to the weld location when certain types of wire electrode are employed. By way of example, inert shielding gas is routed from a gas source, through a welding cable and welding torch, into a gas-diffuser that delivers the gas to the weld location via a nozzle. Welding systems that employ such shielding materials are often referred to in the industry as gas metal arc welding (GMAW) systems, or MIG systems, as mentioned above.

However, there are certain other types of wire electrodes that are employed without a shielding gas. Accordingly, when employing such "gasless" electrodes, the gas routed into the welding cable is blocked from egressing to the environment. In the past, this meant replacing the components at the terminal end of the welding torch with those that prevent the egress of gas. For example, when using gasless wire electrodes, the diffuser is replaced with a component or components that seat the contact tip, prevent the egress of gas from the cable, and electrically insulate a user from the operating current in the contact tip.

Unfortunately, when a welder desires to use both types of electrode, transitioning between these terminal components can be a time consuming task. Moreover, existing arrangements accommodating the different electrode systems generally require an operator to maintain a relatively large inventory of parts, thus increasing the costs of operation.

Therefore, there exists a need for improved contact tip assemblies for welding devices, particularly for facilitating the transition between gas shielded and gasless welding.

BRIEF DESCRIPTION

In accordance with certain embodiments, the present invention provides a securement member for securing a contact tip to a welding torch assembly. The exemplary securement member has a channel extending axially therethrough, and has an internal shoulder that extending into this channel. This internal shoulder abuts against a shoulder on the contact tip, capturing the contact tip between the shoulder and a seating surface on a diffuser, securing the contact tip in the torch assembly. The contact tip may thereby be securely seated without threading, facilitating quick release and installation. Moreover, the exemplary securement member couples to the diffuser such that the egress of fluid from the diffuser is blocked. This blocking allows a user to leave the diffuser secured to the welding torch when a gasless electrode is in use.

In accordance with certain other embodiments, the present invention provides a family of securement members for securing a contact tip with respect to a welding torch assembly. Each exemplary securement member is configured to engage a diffuser of the welding torch. However, one of the securement members is configured to direct fluids egressing from the diffuser toward a weld location, while the other blocks the egress of fluid from the diffuser. This interchangeability allows the for using essentially the same welding torch assembly for a gas-shielded wire electrode and a gasless wire electrode, leading to cost and time savings.

DRAWINGS

These and other features, aspects, and advantages of the present invention will become better understood when the following detailed description is read with reference to the accompanying drawings in which like characters represent like parts throughout the drawings, wherein:

FIG. 2 is a diagrammatic representation of a welding torch assembly for use with the system of FIG. 1, in accordance with an embodiment of the present invention;

FIG. 3 is an exploded view of an exemplary contact tip securement assembly for the torch assembly shown in FIG. 2;

FIG. 4A is a cross-sectional representation taken along line 4-4 of FIG. 2 of a contact tip securement assembly for a shielded wire electrode;

FIG. 4B is a cross-section representation taken along line 4-4 of FIG. 2 of a contact tip securement assembly for a gasless wire electrode.

DETAILED DESCRIPTION

As discussed in detail below, embodiments of the present invention provide a securement member for securing a contact tip with respect to a welding torch assembly. Advantageously, the securement member captures a contact tip to secure it with respect to torch assembly and, moreover, blocks the egress of shielding material from a diffuser to which the securement member is coupled. Accordingly, a welding torch assembly can be quickly adapted for use with a wire electrode that benefits from a shielding material or for use with a gasless wire electrode that does not employ a shielding material.

Figure 1:
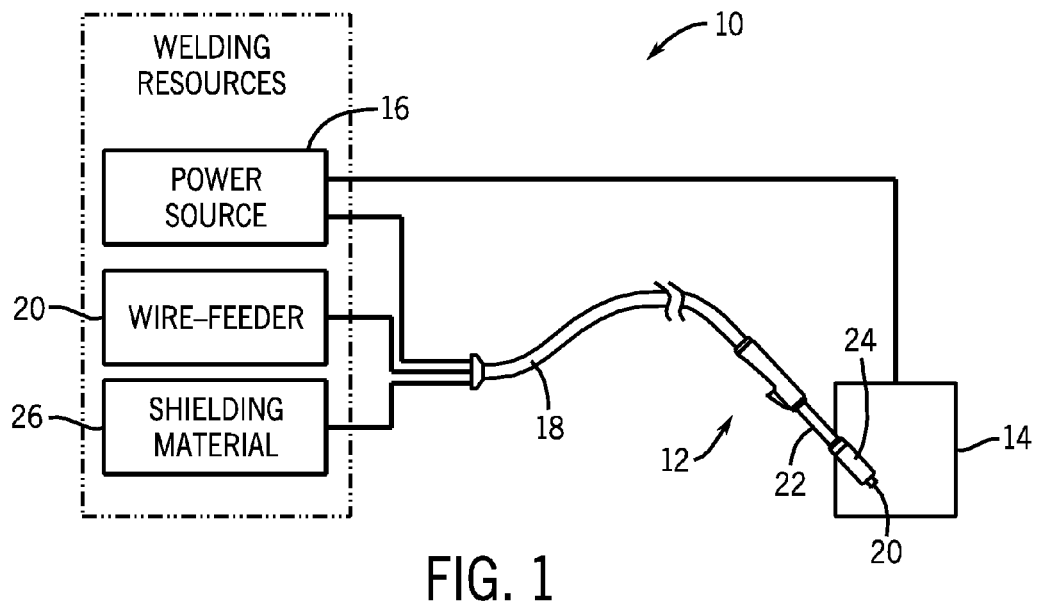
FIG. 1 is a diagrammatic representation of a welding system, in accordance with an embodiment of the present invention.

FIG. 1 illustrates an exemplary wire-feed welding system 10 that incorporates such a securement member. Prior to continuing, however, it is worth noting that the following discussion merely relates to exemplary embodiments of the present technique. As such, the appended claims should not be viewed as limited to those embodiments described herein.

The exemplary welding system 10 includes a welding torch 12 that defines the location of the welding operation with respect to a workpiece 14. Placement of the welding torch 12 at a location proximate to the workpiece 14 allows electrical current, which is provided by a power source 16 and routed to the welding torch 12 via a welding cable 18, to arc from the welding torch 12 to the workpiece 14. In summary, this arcing completes an electrical circuit from the power source 16, to the welding torch 12 via the welding cable 18, to a wire electrode, to the workpiece 14, and, at its conclusion, back to the power source 16, generally to ground. This arcing generates a relatively large amount of heat causing the workpiece 14 and/or filler metal to transition to a molten state, facilitating the weld.

To produce electrical arcing, the exemplary system 10 includes a wire-feeder 20 that provides a consumable wire electrode to the welding cable 18 and, in turn, to the welding torch 12. This wire-electrode can be of various types, including traditional wire electrode or gasless wire electrode. As discussed further below, the welding torch 12 conducts electrical current to the wire electrode via a contact tip 20 located in a neck assembly 22 and supported by securement member 24, leading to arcing between the egressing wire electrode and the workpiece 14.

To shield the weld area from contaminants during welding, to enhance arc performance, and to improve the resulting weld, the exemplary system 10 includes a shielding material source 26 that feeds an inert, shielding gas to the welding torch 12 via the welding cable 18. It is worth noting, however, that a variety of shielding materials, including various fluids and particulate solids, may be employed to protect the weld location. However, certain wire electrodes, such as gasless wire electrodes, do not greatly benefit from a shielding material. Accordingly, when such wire electrodes are employed with the present system, a securement member 24 better suited for such electrodes is employed, as discussed further below.

Referring to FIG. 2, advancement of these welding resources (e.g., welding current, wire electrode, and shielding gas) is effectuated by actuation of a trigger 28 secured to a handle 30. By depressing the trigger 28, a switch (not shown) disposed within the trigger is closed, causing the transmission of an electrical signal that commands delivery of the welding resources into the welding cable 18.

Turning to FIG. 3 and FIGS. 4A and 4B, these figures illustrate a family of securement members 24A and 24B. Each securement member is adapted to capture and secure a welding contact tip 20 with respect to a seating location 32 on a diffuser 34. In the exemplary welding system, the diffuser 34 operates to receive the welding current, wire electrode, and shielding material. During operation, radially extending channels 36 in the diffuser 34 operate to direct shielding gas around an egressing wire electrode. Additionally, the conical shape of the seating location 32 corresponds with the conical shape of the contact tip end 38, thus facilitating centering and engagement of the contact tip 20 with respect to the diffuser 34 and the welding torch as a whole. Such conically shaped diffusers and contact tips are described in U.S. Pat. No. 6,852, 950 that issued on Feb. 8, 2005, and U.S. patent application Ser. No. 10/215,811 that was filed on Aug. 9, 2002, both of which are incorporated herein by reference.

To seat the contact tip 20 with respect to the diffuser 34, the exemplary contact tip 20 includes a shoulder 40 that extends radially beyond the surface of the remainder of the contact tip 20. This shoulder 40 is configured to interact with an internal shoulder of either of the securement members 24A or 24B. As illustrated, each securement member 24A and 24B includes a central channel 42A and 42B, respectively, extending axially therethrough. Additionally, each exemplary securement member 24A and 24B includes an internal shoulder 44A and 44B, respectively, that extends into the respective central channel 42A and 42B.

FIGS. 4A and 4B, which are discussed further below, better illustrate the capture of a contact tip 20 between the securement member 24 and the diffuser 34 when the given securement member is threaded onto the diffuser 34. As generally illustrated in FIG. 3, the respective internal shoulders 44A and 44B are located at a corresponding axial location from an inboard end of the given securement member 24A and 24B. Thus, the securement members 24A and 24B can be interchangeably used with same contact tip 20 and the same diffuser 34. In fact, the securement members 24A and 24B each have similar counterbores 46A and 46B to help seat the securement members 24A and 24B with the same diffuser 34. Moreover, threads 48A and 48B on each securement member 24A and 24B (see FIGS. 4A and 4B) are matched, facilitating threaded engagement of the securement members 24A and 24B with the same diffuser 34. Of course, other mechanisms for mechanically coupling the securement members 24A and 24B with the diffuser 34, such as clamps or friction fit arrangements, may be envisaged. In summary, the securement members 24A and 24B define a family of securement members that can be interchangeably used with the same diffuser and torch assembly, the interchangeable nature facilitating operation of the welding system 10 with shielded wire electrodes and gasless wire electrodes.

Although there are similarities between the securement members 24A and 24B, there are also a number of differences. For example, the larger diameter securement member 24A is designed for use with a wire electrode that benefits from a shielding gas. Accordingly, when the contact tip 20 is captured between the conical seating surface 32 of the diffuser 34 and the internal shoulder 44A of the securement member 24A, a pathway is provided for guiding the shielding material toward the weld location. Specifically, with regard to securement member 24A, gas is routed through the radially extending diffuser channels 36, as represented by arrow 50. This shielding material then enters an interstitial space 52 defined by the exterior of the diffuser 34 and the interior surface of the securement member 24A, which defines the channel 42A. It is the inclusion of the interstitial space 52 that at least partially results in the diameter of the exemplary securement member 24A being slightly larger than exemplary securement member 24B. The shielding material is routed axially though the interstitial space 52 and into axial ports 54 extending through the internal shoulder 44A. Subsequently, the shielding material is routed toward the weld location by the interior surface of the securement member 24A, at the conclusion of which the shielding materials egresses from the member 24A, shielding the egressing wire electrode. As illustrated, arrows 56 represent the flow of shielding material axially through the channel 42A of the securement member 24A.

Along with shielding material, the diffuser 34 also facilitates the routing of electrical current to the contact tip 20 and, ultimately, to the egressing wire electrode. This transmission of current is facilitated by the fact that the exemplary diffuser 34 and the contact tip 20 are formed of a conductive material, such as copper. To insulate the current-carrying members of the assembly, the exemplary securement member 24A includes an insulative layer 60 that insulates the exposed external surface of the securement member from the possibly electrically conductive internal surfaces of the securement member 24A.

Securement member 24B is more particularly designed for use with wire electrodes that do not greatly benefit from shielding material (i.e., gasless operation). As illustrated, the exemplary securement member 24B has a interior channel 44B region that matches closely the diameter of the diffuser 34 where the radial channels 36 are located. When the securement member 24B is threaded onto the diffuser 34, the internal surface 62 of the securement member 24B blocks the egress of shielding material from the channels 36. That is, the exemplary securement member 24B does not present an interstitial space for the flow of shielding material, thus preventing the egress of this material. Moreover, the securement member 24B protects the channels 36 from clogging weld splatter, for instance, when a gasless wire electrode is employed. Advantageously, the body 66 of the securement member 24B is formed of an electrically insulative material, such as plastic, with low heat retention properties. Thus, the body 66 also serves as an electrical insulating member.

Figure 5:
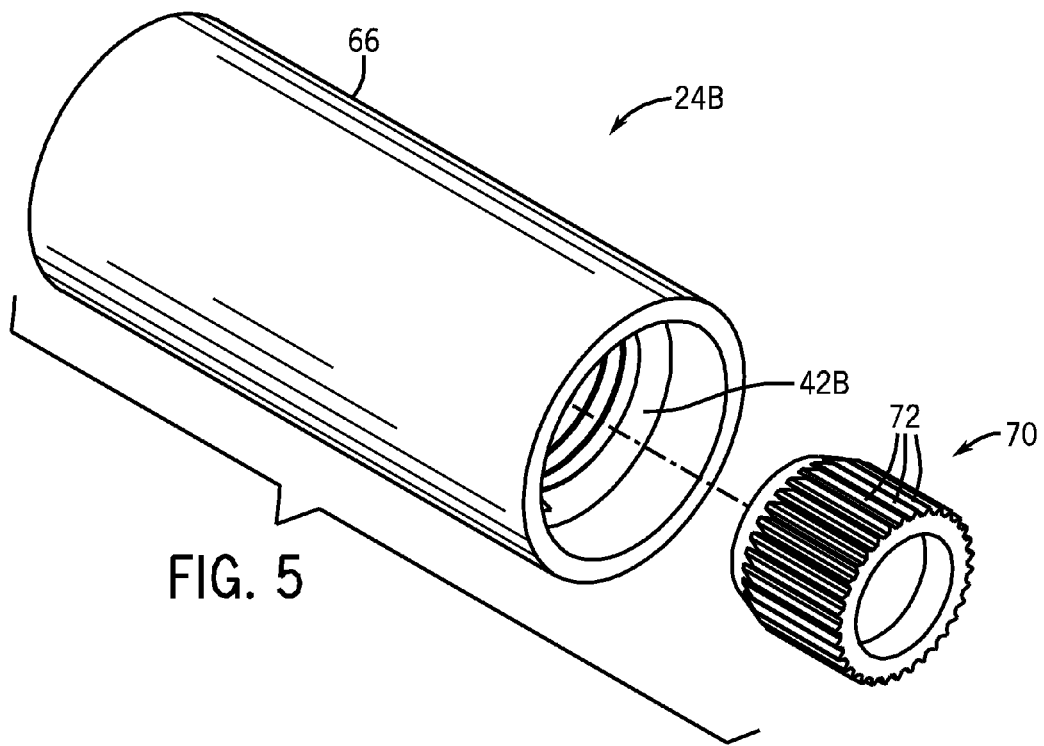
FIG. 5 is a perspective, exploded view of a securement member for the assembly, in accordance with an embodiment of the present invention.

FIG. 5 illustrates the exemplary securement member 24B of FIG. 4B in an exploded view. As illustrated, the exemplary securement member 24B includes a body portion 66 that defines the external surface of the securement member 24B as well as much of the channel 42B. As discussed above, the exemplary body 66 is formed of an electrically insulative material, which, to allow easier user operation, may have low heat retention properties. The exemplary securement member 24B also includes an insert member 70 that defines the internal shoulder 44B. As illustrated, the insert member 70 is a hollow member that has an external surface with a plurality of ribs 72 extending axially thereon. These ribs 72 facilitate a good engagement of the insert member 70 with the body 66 when the insert member 70 is inserted into the body 66. The ribs 72 may plastically deform the body 66, thus well securing the insert member 70 with respect to the body 66. The exemplary insert member 70 is formed of a durable material, such as metal, to provide for a more robust construction.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A securement mechanism for a contact tip of a welding torch assembly, comprising:
   a body comprising a channel extending axially therethrough, wherein the body is securable to the welding torch assembly; and
   an internal shoulder of the body extending into the channel, and configured to engage a contact tip to seat the contact tip with respect to a contact tip seating surface of the welding torch assembly;
   wherein the channel is configured to receive a diffuser of the welding torch assembly and to block egress of fluid from the diffuser.

2. The securement mechanism of claim 1, wherein the internal shoulder comprises a metallic member.

3. The securement mechanism of claim 1, wherein the channel is defined by a first opening having a first width and a second opening having a second width less than the first width.

4. The securement mechanism of in claim 1, wherein the body is generally cylindrical.

5. The securement mechanism of claim 1, wherein the body includes a threaded portion for threaded engagement on the welding torch assembly.

6. The securement mechanism of claim 2, wherein the metallic member comprises a plurality of ribs extending axially along an external surface of the metallic member.

7. The securement mechanism of claim 5, wherein the threaded portion is configured for threaded engagement with a diffuser of the welding torch assembly.

8. A securement assembly for a contact tip of a welding torch assembly, comprising:
   a family of securement members interchangeable with respect to the welding torch assembly, the family comprising:
   a first securement member configured to be coupled to the welding torch assembly with respect to a diffuser to direct fluid egressing from the diffuser toward a weld location, and including a first internal channel receiving the diffuser and an internal shoulder extending into the first internal channel configured to engage with a contact tip to capture the contact tip between the shoulder and the diffuser when assembled; and
   a second securement member configured to be coupled to the welding torch assembly in place of the first securement member with respect to the diffuser to block the egress of fluid from the diffuser, and including a second internal channel receiving the diffuser and a second internal shoulder extending into the channel configured to engage with the contact tip to capture the contact tip between the second shoulder and the diffuser when assembled.

9. The securement assembly of claim 8, wherein the first and second internal shoulders comprise metallic members.

10. The securement of claim 8, wherein the first and second securement members are threadably securable to the diffuser.

11. The securement assembly of claim 8, wherein the first securement member comprises an electrically insulative layer disposed between electrically conductive layers.

12. The securement assembly of claim 8, wherein the first and second securement members are generally cylindrical.

13. The securement assembly of claim 8, wherein the second internal shoulder comprises a insert member having a plurality of ribs extending axially thereon.

14. The securement assembly of claim 8, wherein the second securement member comprises a channel extending axially therethrough, and has a varied cross-sectional diameter.

15. The securement assembly of claim 12, wherein the first securement member has a larger cross-sectional diameter than the second securement member.

16. A securement assembly for a contact tip of a welding torch assembly, comprising:
   a family of interchangeable securement members securable to a diffuser of a welding torch assembly, the family comprising:
      a first securement member having a first internal channel receiving the diffuser extending axially therethrough, including an internal shoulder extending into the channel and configured to engage with the contact tip to seat the contact tip with respect to the diffuser, and being operable to direct fluid egres sing from the diffuser toward a weld location when coupled to the welding torch assembly; and
      a second securement member having a second internal channel receiving the diffuser extending therethrough, including a second internal shoulder extending into the second channel and configured to engage with the contact tip to seat that contact tip with respect to the seating surface, and being operable to block the egress of fluid from the diffuser when coupled to the welding torch.

17. The securement assembly of claim 16, wherein the first and second securement members each include threaded portions engageble with a corresponding threaded portion on the diffuser.

18. The securement assembly of claim 16, wherein the first and second securement members are generally cylindrical.

19. The securement assembly of claim 16, comprising the diffuser.

20. The securement assembly of claim 16, wherein the second securement member comprises a body consisting essentially of an electrically insulative material and an insert member consisting essentially of an electrically conductive material.

21. The securement assembly of claim 19, wherein the diffuser comprise a conical seating surface.

22. The securement assembly of claim 20, wherein the insert member includes a plurality of ribs extending axially thereon.

\* \* \* \* \*